us007376248B2

United States Patent
Ertl et al.

(10) Patent No.: US 7,376,248 B2
(45) Date of Patent: May 20, 2008

(54) METHOD AND DEVICE FOR DETECTING AN OBJECT IN A VEHICLE IN PARTICULAR FOR OCCUPANT PROTECTION SYSTEMS

(75) Inventors: Ludwig Ertl, Regensburg (DE); Thorsten Kohler, Deuerling (DE)

(73) Assignee: Siemens Aktiengesellschaft, Munich (DE)

( * ) Notice: Subject to any disclaimer, the term of this patent is extended or adjusted under 35 U.S.C. 154(b) by 579 days.

(21) Appl. No.: 10/451,100

(22) PCT Filed: Dec. 12, 2001

(86) PCT No.: PCT/DE01/04683

§ 371 (c)(1),
(2), (4) Date: Jun. 19, 2003

(87) PCT Pub. No.: WO02/49882

PCT Pub. Date: Jun. 27, 2002

(65) Prior Publication Data
US 2004/0040772 A1 Mar. 4, 2004

(30) Foreign Application Priority Data
Dec. 20, 2000 (DE) .............................. 100 63 697

(51) Int. Cl.
*G06K 9/00* (2006.01)
(52) U.S. Cl. ..................... 382/104; 382/106; 382/103
(58) Field of Classification Search ................. 382/190, 382/100, 103, 104, 106, 154
See application file for complete search history.

(56) References Cited

U.S. PATENT DOCUMENTS

| 5,896,266 | A | 4/1999 | Rubinski |
| 5,983,147 | A | 11/1999 | Krumm |
| 6,116,639 | A | 9/2000 | Breed et al. |
| 6,433,989 | B1 | 8/2002 | Hinrichsen et al. |

(Continued)

FOREIGN PATENT DOCUMENTS

DE 26 34 479 A1 2/1978

(Continued)

OTHER PUBLICATIONS

Devy et al., "Detection and Classification of Passenger Seat Occupancy Using Sterovision," Proceedings of the IEEE Intelligent Vehicles Symposium 2000, pp. 714-719, Oct. 5, 2000.

(Continued)

*Primary Examiner*—Matthew C. Bella
*Assistant Examiner*—Claire Wang
(74) *Attorney, Agent, or Firm*—Laurence A. Greenberg; Werner H. Stemer; Ralph E. Locher

(57) ABSTRACT

In optical image processing methods for determining the occupation of a vehicle seat, it is advantageous to know the position of the vehicle seat (14), even in the case when said seat is occupied. The above is achieved, whereby the side surface of the backrest (11), facing the camera (30) is part of a boundary plane. A section (T, B), between a separating plane, cutting vertically through the vehicle seat and the boundary plane (B) is at least partly not covered by a seat occupant in the direction of the camera. By means of an image processing method the position of the seat may be determined.

29 Claims, 3 Drawing Sheets

U.S. PATENT DOCUMENTS

| | | | |
|---|---|---|---|
| 6,442,465 B2 * | 8/2002 | Breed et al. | 701/45 |
| 6,856,873 B2 * | 2/2005 | Breed et al. | 701/45 |
| 6,961,443 B2 * | 11/2005 | Mahbub | 382/100 |
| 2002/0050924 A1 * | 5/2002 | Mahbub | 340/426 |
| 2003/0179083 A1 * | 9/2003 | Wallace et al. | 340/426.1 |

FOREIGN PATENT DOCUMENTS

| | | |
|---|---|---|
| DE | 196 17 405 | 11/1996 |
| DE | 196 37 108 A1 | 3/1998 |
| DE | 196 50 579 A1 | 6/1998 |
| DE | 298 06 355 U1 | 6/1998 |
| DE | 197 28 961 A1 | 2/1999 |
| DE | 198 12 745 A1 | 9/1999 |
| DE | 198 33 207 A1 | 2/2000 |
| DE | 199 45 645 A1 | 4/2000 |
| DE | 199 47 062 A1 | 4/2000 |
| DE | 20 2005 008 111 U1 | 9/2005 |
| DE | 10 2006 000 919 A1 | 7/2007 |
| EP | 0 885 782 A1 | 12/1998 |
| EP | 1 049 046 A1 | 11/2000 |
| JP | 54120848 A | 9/1979 |
| JP | 05029062 A | 2/1993 |
| JP | 0618110 A | 6/1994 |
| WO | WO 02/46003 A1 | 6/2002 |
| WO | 2007/077180 A1 | 7/2007 |

OTHER PUBLICATIONS

"New Siemens Sensor Technology Gives Air Bags Depth," Siemens News Release, Oct. 15, 2000.

Phen et al., "Advanced Air Bag Technology Assessment-Final Report," Jet Propulsion Lab Progress Repoer, Apr. 1998.###

* cited by examiner

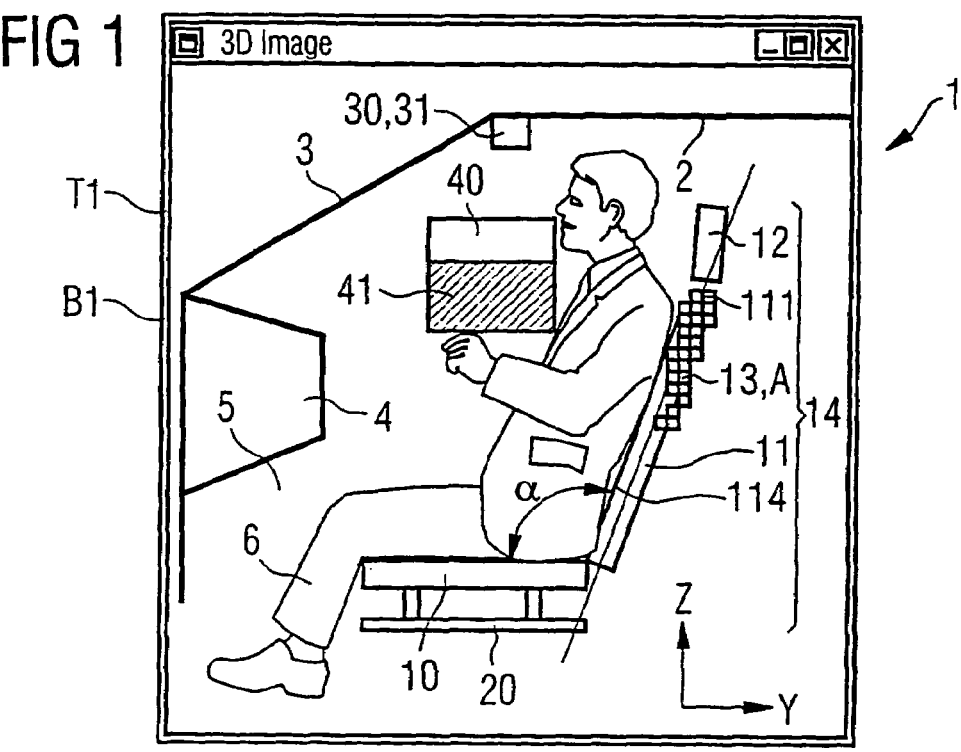
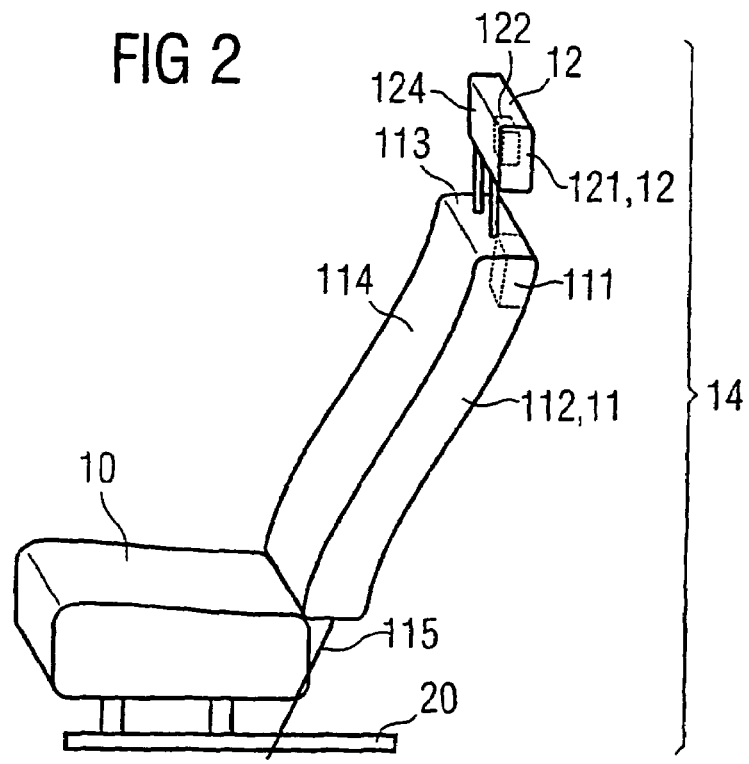

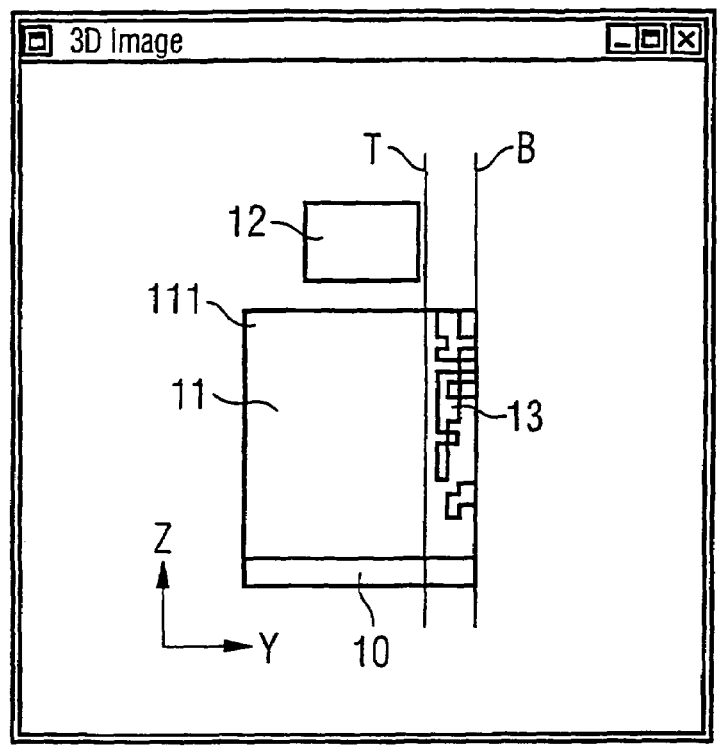
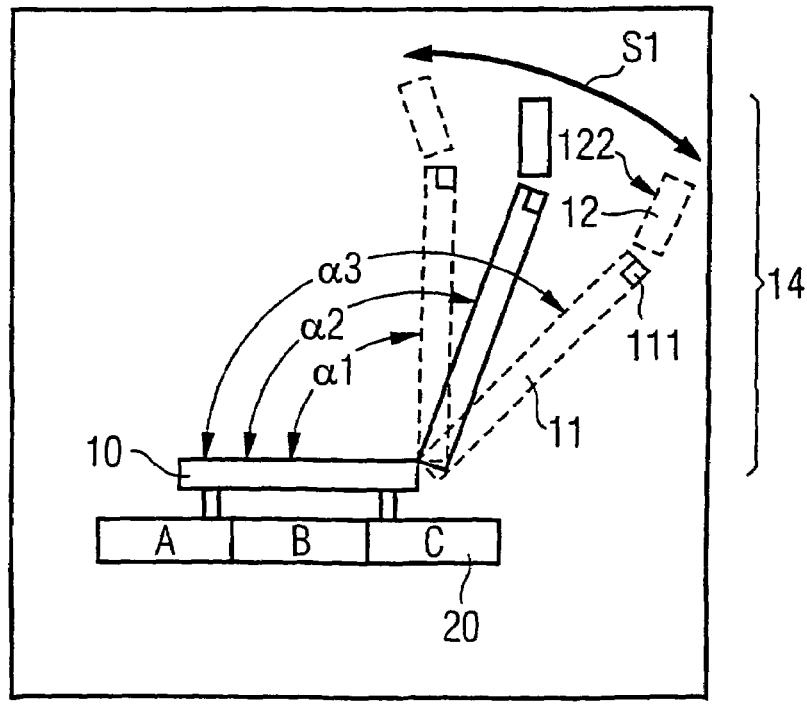

METHOD AND DEVICE FOR DETECTING AN OBJECT IN A VEHICLE IN PARTICULAR FOR OCCUPANT PROTECTION SYSTEMS

CLAIM FOR PRIORITY

This is a national stage application of PCT Application No. PCT/DE01/04683, filed Dec. 12, 2001, which claims the benefit of priority to German Application No. 10063697.7, filed Dec. 20, 2000.

TECHNICAL FIELD OF THE INVENTION

The invention relates to a method and device for detecting an object in a vehicle, in particular for occupant protection systems.

BACKGROUND OF THE INVENTION

A method for determining the position of an object in a vehicle is known from EP 104 90 46. With that method, in particular the position of the head is determined by generating a differential image from two images taken successively by a camera, in which image only the contour of moving objects appears. The contours of the differential images are used to calculate the position of the head.

A method of determining the volume of objects located on the vehicle seat, such as a child car seat or an occupant, is also known. With an image recognition method of this type it is important to know the position and surface shape of the relevant vehicle seat in order, for example, to prevent confusing the head with the headrest or the upper body area with the backrest.

SUMMARY OF THE INVENTION

The invention determines the position of an element, especially of a vehicle seat, together with its surface shape. In one embodiment of the invention, there is a camera which covers a specified image area is disposed in the interior of a vehicle. From the image area a specified section is selected which contains the edge of an element, preferably of a vehicle seat facing the camera. The position of the element is determined from the image information obtained from the specified section. The computing effort required for image processing is advantageously substantially reduced by the limitation to one section of the image area.

An object is, for instance, a child car seat, a vehicle occupant, or something that cannot be assigned a specific location in the vehicle. A vehicle element is, for instance, a part of the vehicle with an assigned location such as a vehicle seat, a window, or a rear-view mirror, which can also be adjustable.

From the image information registered by the camera a distance image is furthermore produced which is transformed into a Cartesian system of coordinates having a fixed vehicle reference. The distance image contains the distance information (image points) of the objects and elements in the vehicle registered with a specified resolution. The x-axis of the coordinate system runs parallel to the longitudinal axis of the vehicle (x-axis), the y-axis runs at right angles to the longitudinal axis of the vehicle, and the z-axis runs vertically to the vehicle.

The specified section is limited by a boundary plane and a separating plane and is divided into volume pixel elements (VOXEL: VOlume piXel ELement). The volume pixel elements take the form of rectangular solids and/or cubes of specified edge length. The volume pixel elements are contiguous but do not overlap. Volume pixel elements which do not contain any image points of an element and/or object are assigned an initial specified value. A volume pixel element of this type is referred to below as being deactivated. Volume pixel elements in which at least one image point of an element and/or object has been registered are assigned at least one other specified value. A volume pixel element of this type is referred to below as being activated.

The use of volume pixel elements advantageously reduces the volume of data as several image points can be combined in one volume pixel element. The use of volume pixel elements furthermore smoothes out the accumulation of image points in the vicinity of the camera thereby causing the image recognition algorithm to operate more simply and reliably.

The volume pixel elements are in each case formed parallel to the coordinate axes of the coordinate system having a fixed vehicle reference.

The volume pixel elements in the specified section are furthermore combined into volume pixel element planes, the specified section between the separating plane and boundary plane being assigned, for example, 3 to 5 volume pixel element planes in juxtaposition. The separating plane and boundary plane are mutually parallel and substantially parallel to the side surface of the vehicle seat or xz plane assigned to the camera.

The specified section is selected such that at least a part of the section includes one element of the vehicle that is not obscured by an object.

For further processing, the volume pixel elements that were activated in the volume pixel element planes are initially projected in an empty evaluation plane in the x direction onto a yz plane. The volume pixel elements considered by the evaluation plane for further evaluation are those that are located within the adjustment range of the element of the vehicle, in particular the adjustment range of the vehicle seat.

In the evaluation plane, a significant point of the registered element is then determined from the activated volume pixel elements for determining the position of the element. For example, as a start point the element can define the top edge of the backrest facing the camera, or the edge of the headrest facing the camera.

In a development, the evaluation plane includes volume pixel elements which are activated and which remained unchanged in the previous measurements. Twenty measurements are combined, for example. This is carried out as follows:

If a volume pixel element of the evaluation plane is activated, a counter for this volume pixel element is incremented by one, although only a maximum specified value can be reached. If the relevant volume pixel element in the evaluation plane is deactivated, the counter is decremented by one. The counter of the volume pixel element must have at least a specified value not equaling zero to be permissible for evaluation. A limitation is imposed on the maximum number of measurements in a cycle so that the process of adjusting the seat can take place with a delay of a few cycles. The activated volume pixel element which is located at the top edge of the vehicle rest facing the camera is selected from among all the volume pixel elements that are permissible in the evaluation plane. This is referred to as the start point for the seatrest.

The mean of the spatial position of the start point can also be taken across several measurements in order to increase the accuracy.

As the thickness and other geometric dimensions of the element comprising, for instance, a vehicle seat is known, the surface shape of the element is calculated/determined from the position of the start point. The volume distribution of the object that may be located in front of the backrest and on the seating surface can be determined with the optical image processing algorithm.

In one aspect, the seat positioning track on which the vehicle seat is mounted so as to be adjustable in its position is subdivided into two or more, preferably three, sections. A seat position sensor registers the position of the vehicle seat and categorizes it into one of the three sections. The position data obtained in this way is used to support optical seat position detection.

The specified section can furthermore include an area which is enclosed by two planes which include the top edge of the window frame facing the camera and containing the window pane and which are arranged parallel to this. The camera in addition registers the top edge of the window pane. The closing motion of the window pane is dependent on the position of the vehicle occupant, or of the object, and on the position of the top edge of the window pane. This ensures protection against objects becoming trapped because the window will not close if the object, for example a vehicle occupant's head or arm, is detected between the window pane and the frame.

The specified section can furthermore include an area which is enclosed by two planes where the boundary plane contains or touches the side surface of the headrest facing the camera and the separating plane is located between the two side surfaces of the headrest. This makes it possible to determine a start point of the headrest that contains, for example, the top surface and the side surfaces facing the camera. This allows the position of the headrest to be additionally determined, which, during further optical processing, in turn allows the vehicle occupant's head to be clearly distinguished from the headrest.

The vehicle seat can be adjusted in the x direction (longitudinal axis of the vehicle). When the vehicle seat is adjusted, the position of the vehicle seat remains substantially constant in the Y direction at right angles to the longitudinal axis. The fixed boundary surface is thus selected as a function of the position of the vehicle seat in the Y direction. The boundary surface in particular includes the side surface of the backrest facing the camera. Running parallel to the boundary plane, toward the center of the vehicle seat, is a separating plane that vertically transects the vehicle seat. The separating plane is preferably located between the side surface of the vehicle seat facing the camera and the headrest. This advantageously increases the accuracy of registering the position of the start point of the backrest of the vehicle seat.

BRIEF DESCRIPTION OF THE DRAWINGS

The invention is described below in more detail with reference to the exemplary drawings and embodiments, in which:

FIG. 1 shows a representation of the interior of a vehicle in the xz plane.

FIG. 2 shows a 3D representation of a vehicle seat.

FIG. 3 shows the projection of the vehicle seat from FIG. 1 in the X direction onto the yz plane.

FIG. 4 shows a vehicle seat with varying inclination of the backrest.

DETAILED DESCRIPTION OF THE INVENTION

Figure 5:
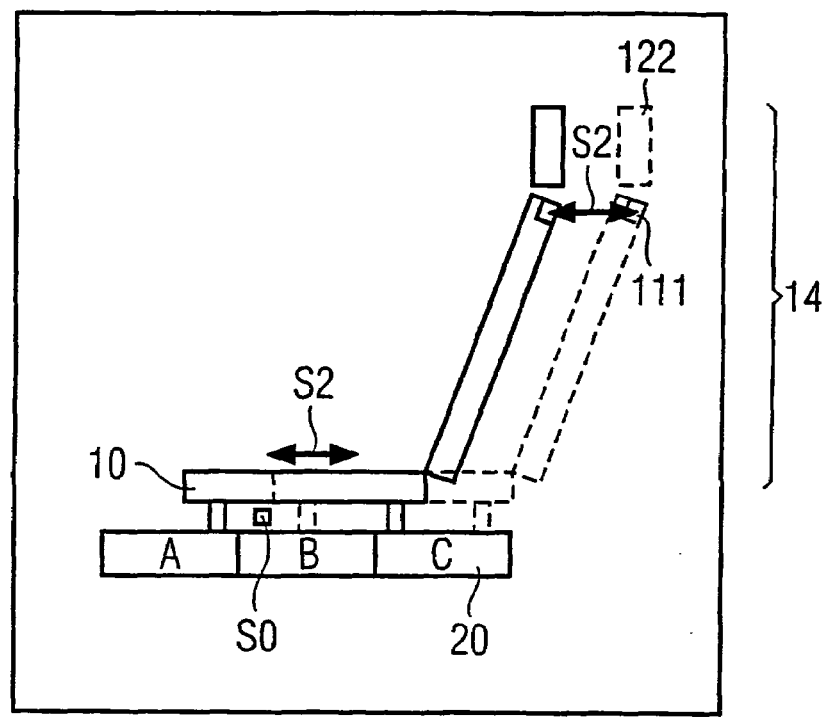
FIG. 5 shows a vehicle seat in various positions along a seat positioning track.

FIG. 1 is a schematic side view of the interior of a vehicle 1. The outline of vehicle 1 is delimited by the roof 2, the sloping windscreen 3, and the area separating the engine from the dashboard 4 and the footwell 5 situated below it.

A camera 30 which is preferably sited between the two front vehicle seats at the level of the seat bases is located in the inside roof lining below the roof 2. An evaluation unit 31 connected in series with the camera 30 is either integrated in the camera 30 or, in a further embodiment, is sited at a separate location in the vehicle.

The camera 30 in each case covers the image area of one of the vehicle seats 14. Additional cameras 30 are used to cover other vehicle seats.

FIG. 1 shows a preferably electrically adjustable window pane 41 which is operated within a window frame 40. Under the windscreen 3 in the interior of vehicle 1 is a dashboard 4 below which is the footwell 5 for accommodating the vehicle occupant's feet and legs. The vehicle seat 14 has a seat base 10 that is supported on a seat positioning track 20 (FIG. 2) so as to be adjustable in the X direction. Immediately adjacent to the seat base 10, inclined at an angle α is the backrest 11 of the vehicle seat 14. The backrest 11 further has a resting surface 114 (reference numeral from FIG. 2) against which the vehicle occupant can rest. A headrest 12 which is mechanically or electrically height-adjustable is located on the end surface 113 (reference numeral from FIG. 2), which faces the roof 2, of the backrest 11.

Shown schematically on the vehicle seat 14 is an occupant 6 whose head is resting against the resting surface 124 (reference numeral from FIG. 2) of the headrest 12, whose upper body area is resting against the resting surface 114 of the backrest 11, whose buttocks and thighs are resting on the seat base 10, and whose lower legs and feet are located in the footwell 5.

The side view further shows several volume pixel elements 13 that have been activated or provided with an additional value and whose function is described further below.

In the interior of vehicle 1 a Cartesian system of xyz coordinates is defined whose X-axis runs parallel to the longitudinal axis of vehicle 1, whose Y-axis runs at right angles to the longitudinal axis of vehicle 1, and whose Z-axis runs vertically.

The camera 30 covers a specified image area of the interior of vehicle 1, the camera 30 having a wide-angle characteristic and preferably an aperture angle of 100 degrees horizontally and 90 degrees vertically. The image area covers at least one of the vehicle seats, but at least the part of the backrest facing the camera. The image area further covers the area of the window frame 40 together with the window pane 41. With the aid of triangulation or stereo imaging methods, the camera registers image information containing distance information of the image points of the elements and objects of vehicle 1 covered by camera 30. This image information is processed by the evaluation unit 31.

The camera 30 preferably has two image sensors whose optical axes have a specified distance of a few millimeters to a few centimeters and so is able to register distance information with the aid of a stereo imaging method and forward it to the evaluation unit for further processing.

FIG. 2 shows the vehicle seat 14 from FIG. 1 in a 3D representation. The backrest 11 has a side surface 112 which, facing toward the center of the vehicle, is assigned to the camera 30. The backrest 11 also has an end surface 113 that faces the headrest 12 or the roof 2. The headrest 12 which is located above the end surface 113 of the vehicle rest 11 and which is supported on two metal rods also has a side surface 121 which faces the center of the vehicle and, diagonally upward, the camera 30, and an end surface 123 which faces the vehicle roof in the Z direction. The vehicle rest 11 and the headrest 12 each have a characteristic geometric feature, for example the start point 111 or 122, which each represent an activated volume pixel element bounded by the side surface 111, 121, the relevant end surface 113, 123, and the rest surface 114, 124. This volume pixel element is preferably shaped as a rectangular solid or cube with a specified edge length/edge lengths.

FIG. 3 represents vehicle seat 14 from FIG. 1 projected in the x direction into the YZ plane. To determine the position of the backrest 11, a specified section T, B is cut out of the image area which is bounded by a boundary plane B and a separating plane T. The two planes B, T run substantially parallel to each other in the X-Z plane or parallel to the side surface 112 of the backrest 11. The computing capacity required to determine the position of the vehicle seat 14 is substantially reduced by the reduction of the image area to a specified section T, B. The section T, B was selected such that the part of the vehicle seat only changes slightly even when it is moved along the seat positioning track 20 in the Y direction. The section T, B was also selected such that characteristic features of the vehicle seat 14, such as the area of the side surface 112 of the backrest 11, are not or are only seldom obscured by an occupant 6 or an object on the vehicle seat.

The side surface 112 of the backrest 11 projected in the X direction is thus contained within the specified section T, B. The boundary plane B is preferably located in the area of the side surface 112. The separating plane T vertically transects the vehicle seat 14 and is located between the side surface 112 of the backrest 11 or, in a further embodiment, between the headrest 12 and the side surface 112 of the backrest 11. The specified section T, B then has a volume (layer) of thickness B-T. This volume of section T, B is then virtually subdivided into volume pixel elements 13 which are shaped as a rectangular solid or cube and which directly border each other without overlapping. The surfaces of the volume pixel elements 13 are preferably formed to be parallel to the axes of the Cartesian coordinate system in the X, Y-Z plane. Several volume pixel element planes, preferably between three and five, are located between the boundary plane B and the separating plane T. Some of the volume pixel elements 13 (only those that have been activated, see below) are represented by way of example in the form of squares in FIG. 1 laterally in the Y direction and in FIG. 2 in the X direction in the area of the backrest 11 and of the headrest 12.

FIG. 4 shows a side view of the vehicle seat 14 from FIG. 1, where the backrest 11, which is supported so as to capable of rotating around the Y-axis in the area of the transition between the seat base 10 and the backrest 11, has different angles of inclination α1, α2, α3. As a result of adjusting the backrest and accordingly altering the angle of inclination α of the seatrest 11, the backrest 11 and the headrest 12, and hence also their start points 111 or 122, move about an adjustment path S1, which is dependent on the distance of the considered (start) point from the rotational position of the backrest 11.

FIG. 5 shows a side view of a vehicle seat 14 from FIG. 1. The vehicle seat has different positions along its adjustment path S2 in the Y direction along the seat positioning track 20. Two positions of the vehicle seat 14 are shown. The seat positioning track 20 is subdivided into 3 segments, A, B, C. A seat position sensor 50 is located on the underside of the seat base 10 or, alternatively, on the seat positioning track 20 and measures the position of the vehicle seat 14 on the seat positioning track 20. The seat position sensor 50 is preferably designed as a Hall sensor and measures only very approximately the position of the vehicle seat 14 in three segments. Only three seat position segments are registered across the entire adjustment path S2 of the vehicle seat 14 in the X direction, with the position of the vehicle seat 14 being roughly subdivided into front (A), center (B), and back (C). The optical evaluation described further below is supported even by this very approximate determination of the position of the vehicle seat 14. In a further embodiment the measuring resolution can also be two or more than three segments.

Figure 6:
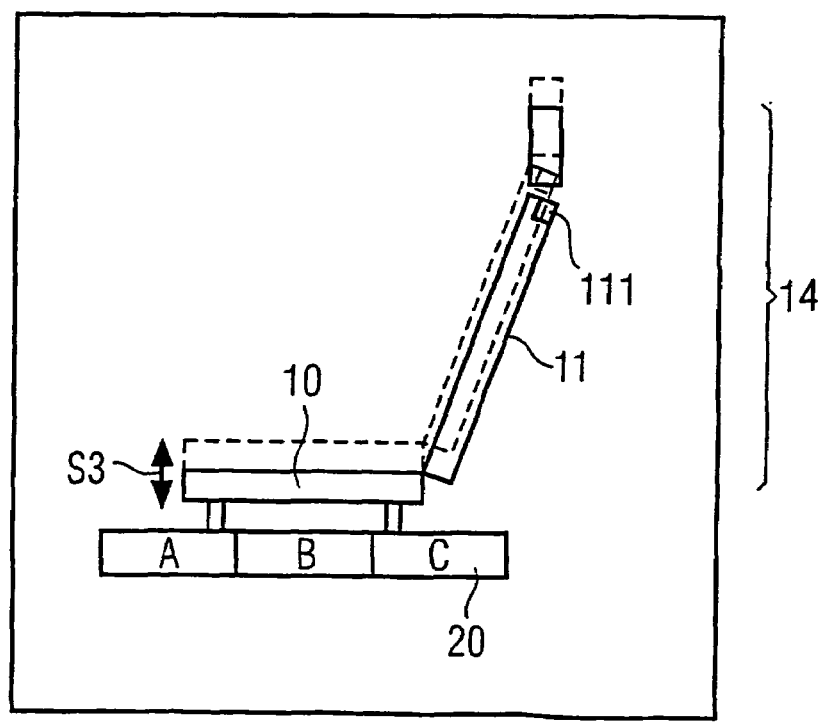
FIG. 6 shows a height-adjustable vehicle seat.

FIG. 6 shows a side view of a vehicle seat 14 from FIG. 1, where the vehicle seat 14 is height-adjustable along its adjustment path S3 in the Z direction. The figure shows two positions of the vehicle seat 14 at different heights. An adjustment in the height of the vehicle seat 14 also causes the height of the start point 111 of the backrest 11 to be changed.

The function of the method for optically detecting an object is described below with the aid of FIGS. 1 to 6:

The camera 30 registers the distance information of the objects 6 and elements 10, 11, 12, 14, 40, 41 in the vehicle's interior. The distance information is generally provided in the form of image points with digital image values which image the surface of the registered objects and elements. The image information can contain different brightness values (grayscales), but also only the approximate information "bright" or "dark", which is to say the image point of an object or element is registered or no image point was registered, which is to say there is no element on this image point. A part of vehicle 1 fixed with reference to the vehicle, such as the windscreen 41 or the vehicle seat 11, is referred to as an element. A mobile part in the interior of the vehicle, such as a child car seat on the vehicle seat 14, an occupant on the vehicle seat 11, or and object on the vehicle seat 11, is referred to as an object.

The distance information represented in image points contains the distance of an image point from the camera 30 under the relevant angles of the relevant image point with reference to the camera 30 and preferably brightness information (grayscales) of an image point. The image points are transformed into the Cartesian X-Y-Z coordinate system that is fixed with reference to the vehicle. The different image point density of the registered elements/objects dependent on the distance from the camera 30 is compensated in order to obtain a representation of the image points that is simplified for further processing and independent of the distance of the camera. This is done using volume pixel elements in the image area:

The image area is subdivided into volume pixel elements preferably formed as rectangular solids and/or cubes of specified edge length whose side surfaces run preferably parallel to the coordinate axes X, Y, Z and which do not overlap. If an image point of an object or element then occurs in a volume pixel element, which is to say if an image point of an element or object has been registered, the volume pixel element will be assigned another, specified value; the volume pixel element is preferably activated. If no image point occurs in the relevant volume pixel element, the volume pixel element will be assigned an initially specified value; the volume pixel element preferably remains deactivated. The use of the volume pixel elements allows the amount of image information to be reduced because a large number of image points can occur in a volume pixel element particularly in the vicinity of the camera that can be combined in one volume pixel element into another value (activate).

For further image processing the volume pixel elements are compared with specified patterns of volume pixel elements, whereby the volume pixel element patterns have, for example, a vehicle seat 14 occupied by an occupant 6, an unoccupied vehicle seat 14, a vehicle seat 14 with a child car seat or similar. Comparing the registered volume pixel elements with the patterns makes it possible to classify the vehicle seat occupancy. It is advantageous for reliable classification to have the surface shape and position of the vehicle seat 14 available in an unoccupied condition. However, an unoccupied condition is not always available in all operating conditions: the vehicle seat is often occupied especially when the vehicle is traveling. A characteristic specified section T, B from the image area is therefore selected which contains parts of the vehicle seat 14 that are at least not totally obscured by the object 6 on the vehicle seat 14. A characteristic edge 112, facing the camera 30, of the backrest 112 of the vehicle seat 14 is furthermore advantageously selected whose position in the y direction is substantially independent of the adjustment of the vehicle seat 14 in the X direction,
the adjustment of the height of the vehicle seat 14 and/or
the adjustment of the inclination of the backrest 11.

By selecting section T, B, which is formed by the boundary plane B an the separating plane T from FIG. 2, a corresponding characteristic feature of the element (vehicle seat 14) is selected which is at least not totally obscured by an object 6 (occupant).

The section T, B has volume pixel elements 13 whose surfaces are parallel to the planes set up by the coordinates. Several volume pixel element planes, preferably between three and five, are located between the boundary plane B and the separating plane T. This means that given an exemplary edge length of about 3 cm of a volume pixel element 13, the specified section T, B will have a thickness of 9 to 15 cm. Different views of the activated volume pixel elements 13 are shown in FIG. 1 and FIG. 2. The activated volume pixel elements 13 accumulate in number in the area of the backrest 11 toward the vehicle roof 2 (Z direction) as the occupant 6 on the vehicle seat 14 obscures the area in the direction of the vehicle floor and the side surface 112 of backrest 11 because of the steeper angle toward camera 30.

For further processing, the volume pixel elements 13 that were activated in these volume pixel element planes are projected into an initially empty evaluation plane in the Y direction into the X-Z plane. The corresponding evaluation plane A is shown in FIG. 1 using the example of the vehicle seat 14 with the activated volume pixel elements 13. The evaluation plane only registers the activated volume pixel elements 13 for further evaluation. A reduction in the volume of data and a smoothing or filtering of the volume pixel element information is advantageously achieved as a result of this.

The evaluation plane A furthermore only takes into account the volume range that is within the maximum adjustment range of the vehicle seat 14. Thus the only volume range that is registered is the one filled by the backrest 11, the seat base 10, and, if the section has been appropriately adapted, also the headrest 12 in all possible positions of the vehicle seat 14. The requisite computing capacity is consequently advantageously further significantly reduced because the outline of the specified section T, B is limited by the maximum adjustment range of the vehicle seat 14.

In a further embodiment the evaluation plane A only registers the volume pixel elements 13 which have remained unchanged at least x times, preferably three times, during a specified period of lapsed time, preferably a period covered by about the last 20 measurements. Taking the mean in this way advantageously enhances the reliability.

The position of parts of the vehicle seat 14 and of the vehicle seat 14 itself is then determined using the specified geometrical dimensions of the vehicle seat 14 with the aid of the activated volume pixel elements 13 of the evaluation plane A. Thus in a further embodiment, through several activated volume pixel elements in the area of the backrest 11 a virtual straight line 115 is applied which is cut with the plane of the seat positioning track 20. This makes it possible to determine the position of the vehicle seat 14 along the seat positioning track 20.

If no activated volume pixel elements 13 can be detected during a measuring cycle in the evaluation plane A, recourse is taken to the activated volume pixel element 13 of the evaluation plane A from a previous measuring cycle and/or a standard inclination of the backrest 11 assumed with an inclination angle of 105 to 110 degrees.

In a further embodiment the above method for detecting the position of the vehicle seat 14 is supported by measuring the vehicle seat in the X direction with the aid of a seat position sensor and/or measuring the weight and/or weight distribution of an object on the vehicle seat 14 with the aid of a weight sensor.

In a further embodiment a switch is attached to the mechanical or electrical seat adjustment device which supplies information about any change to the seat height, to the angle of inclination of the backrest and/or seat position along the seat positioning track 20 in the Y direction (to improve the result of optical image registration).

In a further embodiment the information of the volume pixel elements of the activated volume pixel elements from the evaluation plane A is compared with the grayscale image registered by the camera, thereby enhancing the reliability and accuracy of image evaluation.

The above method therefore advantageously allows the surface shape of the vehicle seat to be determined even when the vehicle seat is occupied.

In a further embodiment the above method is used to provide reliable protection against becoming trapped in the adjustable window pane in the vehicle. This is done with the aid of a specified section running parallel to the top edge of the window frame 40 supporting window pane 41. The closing motion of the window pane 41 is dependent on the position of the vehicle occupant or an object in the interior of the vehicle and on the position of the top edge of the window pane 41.

Other areas of application are conceivable. For example, with the aid of a suitably selected specified section T, B it is possible to detect the position of the rear-view mirror and/or exterior mirrors and to set this as a function of the position of the head of the vehicle occupant 6.

The invention claimed is:

1. A method for detecting a position of a backrest of a vehicle seat, comprising:
    registering a 3D image area in an interior of the vehicle by a camera;
    transmitting image information registered by the camera to an evaluation unit;
    with the evaluation unit, selecting a specified section from the image area, the specified section located between a separating plane and a boundary plane, the separating plane and the boundary plane defined such that at least part of the specified section is at most partially obscured by an object, the boundary plane including and/or touching an edge of the backrest facing the camera, the boundary plane running parallel to a side surface of the backrest, the separating plane vertically transecting the vehicle seat and being parallel to the boundary plane;
    determining the position of the backrest from the image information registered in the specified section.

2. The method according to claim 1, wherein the boundary plane is substantially supported by a z-axis and a x-axis of a vehicle coordinate system, and a position of the boundary plane in a y direction is dependent on a mounting position of the vehicle seat in the y direction.

3. The method according to claim 2, wherein the separating plane is substantially supported by the z-axis and the x-axis of the vehicle coordinate system, and the separating plane is located in the y direction between a headrest of the vehicle seat and the boundary plane.

4. The method according to claim 1, wherein the specified section encompasses an area that includes a side surface of the headrest that faces the camera.

5. The method according to claim 1, wherein: p1 a distance image with image points is produced from the image information, the image is transformed into a Cartesian system of coordinates having a fixed vehicle reference, the Cartesian system of coordinates has a coordinate axis pointing into a longitudinal axis of the vehicle, the Cartesian system of coordinates has a coordinate axis pointing at right angles to the longitudinal axis of the vehicle, and the Cartesian system of coordinates has a coordinate axis pointing vertically; and
    the specified section is subdivided into volume pixel elements, an initial specified value is assigned to a first group of the volume pixel elements in which no image points of the backrest were registered and at least a further specified value is assigned to a second group of the volume pixel elements in which at least one image point of the backrest was registered.

6. The method according to claim 5, wherein values assigned to the volume pixel elements are compared with at least one specified volume pixel element pattern.

7. The method according to claim 5, wherein:
    the volume pixel elements are formed as a rectangular solid or cube with a specified edge length between approximately 2 and 4 cm, which border each other directly without overlapping; and
    surfaces of the volume pixel elements are in each case formed parallel to the coordinate axes of the Cartesian system of coordinates.

8. The method according to claim 5, wherein:
    the separating plane is substantially supported by a z-axis and a x-axis of the Cartesian system of coordinates, and the separating plane is located in a y direction between a headrest of the vehicle seat and the boundary plane; and
    the specified section is subdivided in the y direction into 3 and 5 volume pixel element planes, a third group of the volume pixel elements in the volume pixel element planes that are assigned to another specified value are projected into an evaluation plane, the evaluation plane registers the third group of the volume pixel elements for further evaluation, the third group of volume pixel elements lying within an adjustment range of the backrest of the vehicle.

9. The method according to claim 8, wherein the evaluation plane registers volume pixel elements that have values which have remained unchanged at least a specified number of times, during a specified period of lapsed time.

10. The method according to claim 1, wherein the backrest is moveable in relation to the vehicle.

11. The method according to claim 1, which comprises:
    determining a surface shape and/or a position of the backrest using specified geometric dimensions of the backrest; and
    determining a volume distribution of an object in front of the backrest by using optical detection methods.

12. The method according to claim 1, which comprises:
    determining a position of a starting point of the backrest corresponding to a position of a volume pixel element in an evaluation plane located closest to the camera and a vehicle roof, the volume pixel element provided with a value.

13. The method according to claim 12, which comprises:
    taking a mean of several measurements of the position of the starting point.

14. The method according to claim 12, which comprises:
    from the position of the starting point, taking at least an approximate mean of at least one item selected from a group consisting of an inclination of the backrest, a height position of the vehicle seat, and an adjustment position of the vehicle seat along a seat position track; and
    after taking the mean, calculating at least one surface shape or surface position of a component selected from a group consisting of the vehicle seat, the backrest, a seat base and a headrest.

15. The method according to claim 1, which comprises:
    determining a position of a component selected from a group consisting of a vehicle seat, a seat base, the backrest, a headrest, a window frame, an adjustable window pane, and a vehicle mirror.

16. The method according to claim 1, which comprises:
    determining a position of an object selected from a group consisting of a vehicle occupant, a portion of the vehicle occupant, a child car seat, and an item on the vehicle seat.

17. The method according to claim 1, wherein a further boundary plane is specified by a y position of a side surface of a headrest facing the camera, a further separating plane vertically transects the headrest, and a position of the headrest is determined from volume pixel elements that have been provided with an additional value that are located between the further boundary plane and the further separating plane.

18. The method according to claim 1, which comprises:
    using multiple volume pixel elements, which have been provided with an additional value, of an evaluation plane to register the backrest or a headrest, and using the multiple volume pixel elements to determine a virtual straight line crossing a plane of a seat positioning track in a position point used for determining an overall position of a vehicle seat along the seat positioning track.

19. The method according to claim 1, which comprises:
determining the position of the backrest from a preceding measuring cycle; and
if the position of the backrest cannot be determined from the preceding measuring cycle, applying an angle of inclination of 105° to 110° to the backrest.

20. The method according to claim 1, which comprises:
using a seat position sensor to measure a position of the vehicle seat.

21. The method according to claim 1, which comprises:
using a weight sensor to determine a weight or a weight distribution of an object located on the vehicle seat.

22. The method according to claim 1, which comprises:
using at least one switch for supplying information about a change in at least one seat position parameter selected from a group consisting of a seat height, an angle of inclination of the backrest, and a seat position along a seat positioning track;
the switch attached to a mechanical and/or electrical seat adjustment device.

23. The method according to claim 1, which comprises:
comparing information in an evaluation plane with a grayscale image registered by the camera.

24. The method according to claim 1, which comprises:
determining a surface shape of the vehicle seat when the vehicle seat is occupied.

25. The method according to claim 1, wherein:
the specified section encompasses a bounded area that is bounded by two planes;
the bounded area includes a top edge of a window frame that supports a window pane, the top edge of the window frame faces the camera;
the top edge of the window pane is optically registered by the camera; and
a closing motion of the window pane is dependent on a position of a vehicle occupant and on a position of the top edge of the window pane.

26. The method according to claim 1, wherein a position of a side surface, which faces the camera, of the vehicle seat is determined by a position of the vehicle seat in a y-direction, and the position of the side surface of the vehicle seat remains substantially constant when the vehicle seat is moved in the y direction.

27. The method according to claim 1, wherein the image information registered by the camera is image data, the image data is transmitted by the camera to the evaluation unit, and the image data is processed in the evaluation unit.

28. The method according to claim 27, wherein the camera is implemented as a 3D camera for registering stereo images and includes two image sensors.

29. The method according to claim 27, wherein the camera has an aperture angle of approximately 100×90 degrees.

* * * * *